(12) United States Patent
Tsuboi et al.

(10) Patent No.: US 8,419,999 B2
(45) Date of Patent: Apr. 16, 2013

(54) METHOD FOR PRODUCING ETHYLENE-VINYL ALCOHOL COPOLYMER RESIN, ETHYLENE-VINYL ALCOHOL COPOLYMER RESIN, AND MULTILAYER STRUCTURE

(75) Inventors: Toshio Tsuboi, Pasadena, TX (US); Ray Jouett, Pasadena, TX (US); Robert Armstrong, Pasadena, TX (US); Yoshio Yamamoto, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 44 days.

(21) Appl. No.: 13/075,783

(22) Filed: Mar. 30, 2011

(65) Prior Publication Data

US 2012/0248640 A1    Oct. 4, 2012

(51) Int. Cl.
*B29C 67/00*    (2006.01)
(52) U.S. Cl.
USPC .......................................... 264/492; 264/115
(58) Field of Classification Search .................. None
See application file for complete search history.

(56) References Cited

U.S. PATENT DOCUMENTS

| 6,620,472 B1 * | 9/2003 | Shepard et al. ............. 428/35.4 |
| 6,855,432 B1 * | 2/2005 | Hojabr et al. ................. 428/461 |
| 6,908,668 B2 * | 6/2005 | Hanada et al. ............. 428/304.4 |
| 6,929,705 B2 * | 8/2005 | Myers et al. ................... 148/243 |
| 7,060,346 B2 * | 6/2006 | Yagi et al. ...................... 428/220 |
| 2005/0113540 A1 * | 5/2005 | Weaver et al. ................ 526/308 |
| 2009/0149593 A1 * | 6/2009 | Funabiki et al. .............. 524/442 |
| 2009/0274894 A1 * | 11/2009 | Yoshida et al. ............ 428/319.1 |
| 2011/0030891 A1 * | 2/2011 | Feng et al. ................. 156/272.2 |

FOREIGN PATENT DOCUMENTS

| JP | 46-37665 | 11/1971 |
| JP | 50-100194 | 8/1975 |
| JP | 55-150316 | 11/1980 |
| JP | 11-291245 | 10/1999 |

OTHER PUBLICATIONS

International Search Report and Written Opinion issued Jun. 26, 2012 in Application No. PCT/JP2012/057649 (With English Translation of the Search Report).

* cited by examiner

*Primary Examiner* — Mary F Theisen
(74) *Attorney, Agent, or Firm* — Oblon, Spivak, McClelland, Maier & Neustadt, L.L.P.

(57) ABSTRACT

Provided is by the present invention is a method for producing an EVOH resin having sufficient long-run workability in melt molding and enabling prevention of coloring such as yellowing, an EVOH resin obtained by this method for production, and a laminate obtained from this resin.

The present invention is a method for producing an ethylene-vinyl alcohol copolymer resin, the method including a step of saponifying an ethylene-vinyl ester copolymer to obtain an ethylene-vinyl alcohol copolymer, in which the method is characterized by further including a step of irradiating the ethylene-vinyl ester copolymer or the ethylene-vinyl alcohol copolymer with an infrared ray.

12 Claims, No Drawings

METHOD FOR PRODUCING ETHYLENE-VINYL ALCOHOL COPOLYMER RESIN, ETHYLENE-VINYL ALCOHOL COPOLYMER RESIN, AND MULTILAYER STRUCTURE

BACKGROUND OF THE INVENTION

1. Field of Invention

The present invention relates to a method for producing an ethylene-vinyl alcohol copolymer resin, an ethylene-vinyl alcohol copolymer resin obtained by this method for production, and a laminate having a layer containing this resin.

2. Description of the Related Art

Ethylene-vinyl alcohol copolymers (hereinafter, may be abbreviated as "EVOH") are superior in oxygen barrier properties, transparency, oil resistance, antistatic properties, mechanical strength and the like, and thus have been widely used as various types of wrapping material and the like such as films, sheets, vessels, etc.

These films and the like are usually formed by a melt molding method. Therefore, EVOH is expected to have superior appearance characteristics in melt molding (being enabling molded articles having superior appearances without generation of gels and seeds (dirt under paint), occurrence of coloring such as yellowing, and the like to be obtained), long-run workability (a property capable of obtaining a molded article without change of physical properties such as viscosity, etc., and without occurrence of fish eye, streak, etc., if molded for a long period of time), and the like. In addition, films, sheets and the like are often formed with a multilayered structure having an EVOH layer for the purpose of improving oxygen barrier properties and the like. When such a laminate is to be obtained, a metal salt is often contained in an EVOH resin in order to improve adhesiveness between layers. However, it is known that particularly when a metal salt is included in an EVOH resin, coloring such as yellowing is more likely to be caused, and thus appearance characteristics are deteriorated.

Under such circumstances, in order to improve various characteristics demanded for EVOH, particularly appearance characteristics, a variety of processes such as a process of irradiating EVOH with an ultraviolet ray (see JP-A No. S50-100194) and a process of irradiating EVOH with a microwave (see JP-A No. H11-291245) were proposed.

However, according to these methods for production, coloring such as yellowing is not sufficiently prevented, and they are further disadvantageous in running costs being high, influences on human bodies being significant, difficulty in adjusting the drying time, and the like. Specifically, for example, when EVOH is irradiated with an ultraviolet ray, energy of the ultraviolet ray is so great that significant negative influences on human bodies may be concerned. Also, when, for example, a microwave is irradiated, deterioration occurs even if irradiated for a short time period of time, and is thus disadvantageous in deteriorated long-run workability.

PRIOR ART DOCUMENTS

Patent Documents

Patent Document 1: JP-A No. S50-100194
Patent Document 2: JP-A No. H11-291245

SUMMARY OF THE INVENTION

The present invention was made in view of the foregoing circumstances, and an object of the invention is to provide a method for producing an EVOH resin having sufficient long-run workability in melt molding and enabling prevention of coloring such as yellowing, an EVOH resin obtained by this method for production, and a laminate obtained from this resin.

The present inventors found that an EVOH resin enabling prevention of coloring such as yellowing can be obtained without deteriorating long-run workability by irradiating an ethylene-vinyl ester copolymer (hereinafter, may be abbreviated as "EVAc") that is a precursor of EVOH, or EVOH with an infrared ray. Moreover, the present inventors thoroughly investigated, and consequently the present invention was accomplished.

An aspect of the invention made in order to solve the foregoing problems is to provide a method for producing an ethylene-vinyl alcohol copolymer resin, the method comprising a step of saponifying an ethylene-vinyl ester copolymer to obtain an ethylene-vinyl alcohol copolymer, which method further comprising a step of irradiating the ethylene-vinyl ester copolymer or the ethylene-vinyl alcohol copolymer with an infrared ray.

According to the method for producing an EVOH resin, yellowing of the resulting EVOH resin can be prevented without deteriorating long-run workability by including a step of irradiation with an infrared ray.

The irradiation with an infrared ray in the step of irradiation with an infrared ray is preferably carried out with an infrared ray lamp. Also, in the step of irradiation with an infrared ray: the wavelength of the infrared ray is preferably 700 nm or greater and 1,000,000 nm or less; the intensity of the infrared ray is preferably $30 \times 10^3$ W/m$^3$ or greater and $3,000 \times 10^3$ W/m$^3$ or less; and the irradiation time of the infrared ray is preferably 0.1 hrs or longer and 20 hrs or shorter. When the wavelength, the intensity and irradiation time of the infrared ray fall within the above range, yellowing of EVOH can be further prevented. In addition, when irradiation is carried out with an infrared ray lamp, the conditions and the like can be readily adjusted.

When the step of irradiation with an infrared ray is carried out not before the saponification step, the temperature of the ethylene-vinyl alcohol copolymer resin in this step of irradiation with an infrared ray is preferably the glass transition point or greater and the melting temperature or less of the ethylene-vinyl alcohol copolymer. Yellowing can be further prevented by irradiating the EVOH resin with an infrared ray at a temperature within this range.

When the step of irradiation with an infrared ray is carried out prior to the saponification step, the temperature of the ethylene-vinyl ester copolymer resin in this step of irradiation with an infrared ray is preferably 40° C. or greater and 110° C. or less. The yellowing can be further prevented by irradiating the EVAc resin with an infrared ray at a temperature within this range.

Provided that the method for production further has a pelletization step of obtaining a hydrous pellet including an ethylene-vinyl alcohol copolymer from a solution containing the ethylene-vinyl alcohol copolymer obtained by the saponification step, the step of irradiation with an infrared ray is preferably carried out not before the pelletization step.

When the irradiation with an infrared ray is carried out on the hydrous pellet, the water content of this hydrous pellet before irradiating with an infrared ray is preferably 10% by mass or greater and 200% by mass or less.

Provided that the method for production further has a drying step of drying the hydrous pellet to obtain a dry pellet having a water content of 0.01% by mass or greater and less than 10% by mass, the step of irradiation with an infrared ray is preferably carried out not before the drying step.

Provided that the method for production further has a molding step of molding the dry pellet to obtain a molded product including an ethylene-vinyl alcohol copolymer, the step of irradiation with an infrared ray is preferably carried out not before the molding step.

The dry pellet or the molded product preferably has a water content before irradiating with an infrared ray of 0.01% by mass or greater and less than 10% by mass.

When the step of irradiation with an infrared ray is carried out not before the saponification step, the yellowing of the resulting EVOH resin can be further prevented by irradiation with an infrared ray is carried out under the aforementioned each condition.

The ethylene-vinyl alcohol copolymer resin of the present invention is a resin obtained by the method for producing an ethylene-vinyl alcohol copolymer resin.

The ethylene-vinyl alcohol copolymer resin preferably does not substantially contain a polyene compound in a region from the surface over the depth of 5 nm.

The ethylene-vinyl alcohol copolymer has an ethylene content of preferably 20% by mole or greater and 60% by mole or less, and a degree of saponification of preferably 90% by mole or greater.

The ethylene-vinyl alcohol copolymer resin preferably has a pellet form or film form.

The laminate of the present invention is a laminate having at least one layer containing the ethylene-vinyl alcohol copolymer resin.

Herein, the term "ethylene-vinyl alcohol copolymer (EVOH) resin" means a resin containing EVOH as a principal component, and this resin may contain other component. Further, the form of this resin is not particularly limited, and may include, for example, a solid form, liquid form, solution form, and the like.

As explained in the foregoing, according to the method for producing an EVOH resin of the present invention, an EVOH resin that is superior in appearance characteristics of having sufficient long-run workability in melt molding, and enabling prevention of coloring such as yellowing can be obtained. Furthermore, according to the resin obtained by the method for production, various types of molded products such as pellets, monolayer or multilayer films, sheets, pipes, vessels and fibers that are superior in appearance characteristics can be obtained while enabling prevention of yellowing.

DESCRIPTION OF THE PREFERRED EMBODIMENTS

Hereinafter, preferred embodiments for carrying out the present invention are explained in detail.

The method for producing an EVOH resin of the present invention is characterized in that in a method for producing an EVOH resin having a saponification step for saponifying an ethylene-vinyl ester copolymer (EVAc) to obtain an ethylene-vinyl alcohol copolymer (EVOH), a step of irradiation with an infrared ray for irradiating the EVAc or EVOH with an infrared ray is further included.

<Infrared Ray>

In the method for production of the present invention, due to further having a step of irradiation of EVAc or EVOH with an infrared ray for irradiating with an infrared ray in a production step of an EVOH resin as described above, coloring such as yellowing of the resulting EVOH resin is prevented, and an EVOH resin having further sufficient long-run workability in melt molding can be obtained. Although the mechanism of achieving such effects has not been necessarily known, for example, the following mechanism may be envisaged. Irradiation with an infrared ray activates movement of molecular chains, and thus polyene compounds (particularly polyene compounds having 4 to 8 carbon atoms) that are presumed to be the cause of coloring being present in the resin are volatilized. Accordingly, coloring such as yellowing is prevented, and still further generation of fine seeds (dirt under paint) can be suppressed even in melt molding at a comparatively high temperature.

Although the light source used in the step of irradiation with an infrared ray in the method for production of the present invention is not particularly limited, an infrared ray lamp is preferably used in light of favorable operability.

The wavelength (which is to be the dominant wavelength) of the infrared ray irradiated is preferably 700 nm or greater and 1,000,000 nm or less. When the wavelength of the infrared ray falls within this range, the movement of the molecular chain is activated. In this step, when the wavelength of the light emitted from the light source has a width, it is preferred that the wavelength to be the dominant wavelength of the light falls within this range. The lower limit of the wavelength of the infrared ray is preferably 700 nm, more preferably 800 nm, still more preferably 900 nm, and particularly preferably 1,000 nm. On the other hand, the upper limit of the infrared ray wavelength is preferably 1,000,000 nm, more preferably 10,000 nm, still more preferably 4,000 nm, and particularly preferably 2,500 nm. When the wavelength of the infrared ray is below the lower limit, movement of the molecular chain in the resin may be less likely to be activated. On the other hand, when the wavelength of the infrared ray is beyond the upper limit, a dehydration reaction proceeds to increase double bonds in the main chain due to excessively elevated temperature of the resin containing EVAc or EVOH, leading to enhanced coloring, whereby the appearance may be deteriorated.

Although the intensity of the infrared ray is not particularly limited, it is preferably $30 \times 10^3$ W/m$^3$ or greater and $3,000 \times 10^3$ W/m$^3$ or less. When the intensity of the infrared ray falls within this range, the polyene compounds can be efficiently volatilized, and as a result, coloring such as yellowing can be further prevented.

The lower limit of the intensity of the infrared ray is preferably $30 \times 10^3$ W/m$^3$, more preferably $100 \times 10^3$ W/m$^3$, still more preferably $150 \times 10^3$ W/m$^3$, and particularly preferably $240 \times 10^3$ W/m$^3$. On the other hand, the upper limit of the intensity of the infrared ray is preferably $3,000 \times 10^3$ W/m$^3$, more preferably $2,000 \times 10^3$ W/m$^3$, still more preferably $1,400 \times 10^3$ W/m$^3$, and particularly preferably $350 \times 10^3$ W/m$^3$. When the intensity of the infrared ray is smaller than the lower limit, the amount of volatilized polyene compounds becomes so low that the coloring may not be sufficiently prevented. On the other hand, when the intensity of the infrared ray is beyond the upper limit, the dehydration reaction proceeds to increase the double bonds in the main chain of EVOH due to excess elevation of the resin temperature, whereby the appearance may be deteriorated, and handleability may be impaired as a result of dissolution of the resin.

In this regard, the intensity of the infrared ray can be determined by calculating according to the following formula (I) when a cylindrical vessel charged with a resin prepared as a solution is irradiated with an infrared ray from above.

[formula 1]

$$\text{Intensity of infrared radation} = \frac{\text{wattage of infrared radiation lamp}}{\begin{pmatrix} \text{distance from the} \\ \text{infrared radiation light} \\ \text{source to the vessel} \end{pmatrix} \times \begin{pmatrix} \text{area of the vessel} \\ \text{irradiated with the} \\ \text{infrared radiation} \end{pmatrix}} \quad (I)$$

It should be noted that also in the case of resins having a particulate form such as pellets or a film form, the intensity of the infrared ray can be calculated according to the above calculation process.

The irradiation time of the infrared ray is preferably 0.1 hrs or longer and 20 hrs or shorter. When the irradiation time of the infrared ray falls within this range, the resin temperature is elevated to allow the polyene compounds to be volatilized, whereby occurrence of coloring such as yellowing can be further prevented.

Accordingly, in the case of infrared rays, deterioration of the resin is not found when the irradiation time is 20 hrs or shorter. Whereas, deterioration of the resin is found for 300 sec longer when the wavelength of the infrared ray is beyond 1,000,000 nm (for example, microwave); therefore, it is concluded that the irradiation time of the irradiation with an infrared ray can be easily adjusted.

The lower limit of the irradiation time of the infrared ray is preferably 0.1 hrs, more preferably 0.3 hrs, still more preferably 0.4 hrs, and particularly preferably 0.5 hrs. On the other hand, the upper limit of the irradiation time of the infrared ray is preferably 20 hrs, more preferably 10 hrs, still more preferably 5 hrs, and particularly preferably 1 hour. When the irradiation time of the infrared ray is shorter than the lower limit, the amount of volatilization of the polyene compounds becomes small and thus the coloring may not be sufficiently prevented. On the other hand, when the irradiation time is beyond the upper limit, elevation of the resin temperature becomes drastic, whereby deterioration of the resin is significantly enhanced, and also handleability may be deteriorated due to dissolution of the resin.

<Method for Producing EVOH Resin>

Hereinafter, the method for producing an EVOH resin of the present invention is specifically explained. Specifically, the method for producing an EVOH resin of the present invention has, similarly to general methods for producing EVOH resins:

a polymerization step for comopolymerizing ethylene and a vinyl ester to obtain EVAc;

a saponification step for saponifying the EVAc to obtain EVOH;

a pelletization step for obtaining a hydrous pellet containing EVOH from a solution containing EVOH obtained in the saponification step;

a washing step for washing the hydrous pellet;

a drying step for drying the hydrous pellet to obtain a dry pellet; and a molding step for molding the dry pellet to obtain a molded product including EVOH, and furthermore, the aforementioned step of irradiation with an infrared ray is included. It should be noted that steps other than the saponification step and the step of irradiation with an infrared ray are not prerequisite.

(Polymerization Step)

Although a copolymerization process of ethylene with the vinyl ester is not particularly limited, for example, any of solution polymerization, suspension polymerization, emulsion polymerization, bulk polymerization and the like may be employed. Also, either a continuous system or a batchwise system may be employed.

As the vinyl ester used in polymerization, fatty acid vinyl such as vinyl acetate, vinyl propionate or vinyl pivalate, or the like may be suitably used.

In the polymerization described above, in addition to the aforementioned components, a copolymerizable monomer as a copolymerization component, for example, alkene; an unsaturated acid such as acrylic acid, methacrylic acid, crotonic acid, maleic acid or itaconic acid, or an anhydride, a salt, a mono- or dialkyl ester thereof, or the like; nitrile such as acrylonitrile or methacrylonitrile; amide such as acrylamide or methacrylamide; olefin sulfonic acid such as vinylsulfonic acid, allylsulfonic acid or metaallylsulfonic acid, or a salt thereof; an alkylvinyl ether, vinyl ketone, N-vinylpyrrolidone, vinyl chloride, vinylidene chloride or the like may be also copolymerized in a small amount.

Additionally, a vinylsilane compound may be included in an amount of 0.0002% by mole or greater and 0.2% by mole or less as a copolymerization component. Herein, the vinylsilane compound may include, for example, vinyltrimethoxysilane, vinyltriethoxysilane, vinyltri(β-methoxy-ethoxy)silane, γ-methacryloyloxypropylmethoxysilane or the like. Of these, vinyltrimethoxysilane, or vinyltriethoxysilane is suitably used.

A solvent which may be used in the polymerization is not particularly limited as long as it is an organic solvent which can dissolve ethylene, vinyl ester and the ethylene-vinyl ester copolymer. As such a solvent, for example, an alcohol such as methanol, ethanol, propanol, n-butanol or tert-butanol; dimethyl sulfoxide or the like may be used. Of these, methanol is particularly preferred in light of ease in removal and separation after the reaction.

As a catalyst for use in the polymerization, for example, an azonitrile based initiator such as 2,2-azobisisobutyronitrile, 2,2-azobis-(2,4-dimethylvaleronitrile), 2,2-azobis-(4-methoxy-2,4-dimethylvaleronitrile) or 2,2-azobis-(2-cyclopropylpropionitrile); an organic peroxide based initiator such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide or t-butyl hydroperoxide, or the like may be used.

The polymerization temperature is preferably 20° C. or greater and 90° C. or less, and more preferably 40° C. or greater and 70° C. or less. polymerization time is preferably 2 hrs or longer and 15 hrs or shorter, and more preferably 3 hrs or longer and 11 hrs or shorter. The rate of polymerization is preferably no less than 10% and no greater than 90%, and more preferably no less than 30% and no greater than 80% relative to the vinyl ester charged. The resin content in the solution after the polymerization is preferably 5% by mass or greater and 85% by mass or less, and more preferably 20% by mass or greater and 70% by mass or less.

After carrying out the polymerization for a predetermined time, or after reaching a predetermined rate of polymerization, a polymerization inhibitor is added if necessary, and unreacted ethylene gas is removed by evaporation, followed by removing unreacted vinyl ester. As a process of removing an unreacted vinyl ester, for example, a process including continuously supplying the copolymer solution at a constant rate through an upper part of a tower filled with Raschig ring, blowing therein an organic solvent vapor such as methanol through a lower part of the tower, distilling off mixed vapor of the organic solvent such as methanol and unreacted vinyl ester through the top of the tower, and taking out the copolymer solution from which the unreacted vinyl ester was removed through the bottom of the tower, or the like may be employed.

(Step of Irradiation with Infrared Ray 1: Irradiation on EVAc)

By irradiating the ethylene-vinyl ester copolymer (EVAc) prior to saponification obtained by the aforementioned process with an infrared ray, an EVOH resin having sufficient long-run workability in melt molding, and enabling prevention of coloring such as yellowing can be finally obtained. The temperature of the EVAc resin in irradiation with an infrared ray is preferably 40° C. or greater and 110° C. or less. When the temperature of the EVAc resin falls within this range, the polyene compounds included in the resin are volatilized, and thus occurrence of coloring such as yellowing can be further prevented. In this respect, the EVAc resin on which an infrared ray is irradiated may be either a paste composed of the copolymer, or a solution containing the copolymer.

Note that in the case in which a solution containing the EVAc resin is employed, the temperature of the EVAc resin is equal to the temperature of the solution. In the case of a solid such as a paste, the temperature of the EVAc resin is determined by measuring the temperature of the paste or the like with a thermometer inserted into the paste every 5 min until a constant measurement is found, and calculating an average temperature of the measurements found at five sites.

The lower limit of the temperature of EVAc during the irradiation with an infrared ray is preferably 40° C., more preferably 45° C., still more preferably 50° C., and particularly preferably 60° C. On the other hand, the upper limit of the temperature of the copolymer is preferably 110° C., more preferably 90° C., still more preferably 80° C., and particularly preferably 70° C. When the temperature of the copolymer is below the lower limit, movement of the molecular chain of EVAc becomes insufficient, volatilization of the polyene compounds that become the cause of coloring does not occur sufficiently. On the other hand, when the temperature is beyond the upper limit, deterioration of the copolymer proceeds, leading to enhanced coloring, and thus the appearance of the resulting EVOH resin may be finally deteriorated.

(Saponification Step)

Next, a step of saponifying EVAc is included in the present invention. The saponification process may be either continuous system, or a batchwise system. The catalyst which may be used in the saponification is not particularly limited, but is preferably an alkali catalyst, and for example, sodium hydroxide, potassium hydroxide, alkali metal alcoholate or the like may be used.

Conditions of saponification may include, for example, in the case of batchwise system: copolymer solution concentration being 10% by mass or greater and 50% by mass or less; the reaction temperature being 30° C. or greater and 60° C. or less; the amount of the catalyst used being 0.02 mol or greater and 0.6 mol or less per mol of the vinyl ester structural unit; and the saponification time being 1 hour or longer and 6 hrs or shorter.

In this manner, a solution or a paste containing EVOH is obtained. Since EVOH yielded after completing the saponification reaction contains the alkali catalyst, by-product salts such as sodium acetate and potassium acetate, and other impurities, these are preferably removed by neutralizing and washing as needed. When EVOH after completing the saponification reaction is washed with water that scarcely contains metal ion, chloride ion and the like such as ion exchanged water, sodium acetate, potassium acetate and the like may partly remain.

(Pelletization Step)

Next, in the pelletization step, the EVOH solution obtained as described above is pelletized by extrusion to give a strand form. Alternatively, this solution may be pelletized by cutting in a molten state.

When an EVOH solution is pelletized by extrusion to give a strand form, water or a water/alcohol mixed solvent, aromatic hydrocarbons such as benzene and acetone, ketones such as methyl ethyl ketone, ethers such as dipropyl ether, organic acid esters such as methyl acetate, ethyl acetate and methyl propionate, and the like may be used as a solidification liquid for use in deposition, but water or a water/alcohol mixed solvent is preferred in light of easy handling. As the alcohol, methanol, ethanol, propanol or the like may be used, and methanol is preferably used in terms of industrial aspects. Although the mass ratio of the solidification liquid to the strand of EVOH in the solidification liquid (solidification liquid/strand of EVOH) is not particularly limited, it is preferably 50 or greater and 10,000 or less, and more preferably 100 or greater and 1,000 or less. When the mass ratio falls within this range, to obtain a hydrous EVOH pellet having uniform size distribution is enabled.

The temperature at which the EVOH solution is brought into contact with the solidification liquid is preferably −10° C. or greater and 40° C. or less, more preferably 0° C. or greater and 20° C. or less, and particularly preferably 0° C. or greater and 10° C. or less. The EVOH solution is extruded into the solidification liquid as described above to give a strand form with a nozzle having an arbitrary form. Although the shape of such a nozzle is not particularly limited, it is preferably a circular cylindrical shape. Also, the length is preferably 1 cm or greater and 100 cm or less, and more preferably cm or greater and 30 cm or less, whereas the internal diameter is preferably 0.1 cm or greater and cm or less, and more preferably 0.2 cm or greater and 5.0 cm or less. Thus, EVOH (solution) is extruded to give a strand form from the nozzle. In this process, the strand may not necessarily be single, and can be extruded to provide arbitrary number of several strands to several hundred strands.

Next, EVOH extruded to give a strand form is cut after sufficiently solidified, and then pelletized followed by washing with water. With respect to the form of such a pellet, the diameter is preferably 1 mm or greater and 10 mm or less, and the length is preferably 1 mm or greater and 10 mm or less (more preferably, each being 2 mm or greater and 6 mm or less) in the case of a circular cylinder, or the diameter is preferably 1 mm or greater and 10 mm or less (more preferably being 2 mm or greater and 6 mm or less) in the case of a sphere.

(Washing Step)

Subsequently, the hydrous EVOH pellet is preferably washed with water at a temperature of 10° C. or greater and 40° C. or less in a water bath. Oligomers and impurities in EVOH are removed by such a washing step with water.

(Drying Step)

Thereafter, a drying step may be included in which the hydrous pellet is dried to obtain a dry pellet having a water content of 0.01% by mass or greater and less than 10% by mass. Although the drying process is not particularly limited, hot-air drying may be exemplified.

(Molding Step)

In addition, the dried EVOH resin may be formed into any of various types of a molded product such as a film, sheet, vessel, pipe or fiber by melt molding. It is possible to subject these molded articles to remolding for the purpose of reuse of the same after crushing. Alternatively, the film, sheet, fiber or the like can also be monoaxially or biaxially stretched.

As the melt molding process, extrusion molding, inflation extrusion, blow molding, melt spinning, injection molding and the like are permitted.

The melt temperature in carrying out the melt molding is not particularly limited, but is preferably about 150° C. or greater and 300° C. or less.

(Step of Irradiation with Infrared Ray 2: Irradiation on EVOH)

Also by irradiating EVOH with an infrared ray after subjecting to the aforementioned saponification step, an EVOH resin having sufficient long-run workability in melt molding, and enabling prevention of coloring such as yellowing can be finally obtained. The resin containing EVOH irradiated with an infrared ray may be any one of a solution, a paste, a hydrous pellet, a dry pellet or a molded product including EVOH. The timing when the step of irradiating with an infrared ray is carried out not particularly limited as long as it is simultaneously with the saponification step or following the saponification step, and the irradiation step may be carried out, for example, (1) simultaneously with the saponification step, or after the saponification step and before the pelletization step, (2) simultaneously with the pelletization step, or after the pelletization step and before the washing step, (3) simultaneously with the washing step, or after the washing step and before the drying step, (4) simultaneously with the simultaneously with the drying step, or after the drying step and before the molding step, or (5) simultaneously with the molding step, or after the molding step.

Of these, carrying out the step of irradiation with an infrared ray is carried out preferably after the pelletization step, and specifically, carrying out after the (2) above is preferred since the concentration of the EVOH resin is low in the case of solution and paste forms. Since the hydrous pellets have a so high water content that the resin temperature is not elevated satisfactorily by irradiation with an infrared ray, whereby the polyene compound may not be volatilized enough; therefore, the irradiation with an infrared ray is also preferably carried out after the drying step, and more specifically after the (4) above. On the other hand, in the case of molded products such as films, the water content is low, and thus azeotropy of the polyene compound with water is less likely to occur; therefore, the irradiation with an infrared ray is carried out preferably on a dry pellet, and more specifically according to the (4) above. Also, in light of effective volatilization of the polyene compound on the surface of the final molded product and prevention of yellowing, irradiating an infrared ray according to the (5) above is preferred.

The lower limit of the temperature of the EVOH resin in the irradiation with an infrared ray is preferably the glass transition point of the EVOH, more preferably 80° C., still more preferably 100° C., and particularly preferably 130° C. On the other hand, the upper limit of the resin temperature is preferably the melting temperature of EVOH, more preferably 160° C., still more preferably 155° C., and particularly preferably 150° C. When the resin temperature is below the lower limit, the stretching vibration of the hydroxyl group included in the resin is not sufficient, and thus volatilization of polyene does not occur enough. On the other hand, when the resin temperature is beyond the upper limit, deterioration of the resin proceeds, leading to enhanced coloring, and thus the appearance may be deteriorated.

Note that in the case in which a solution containing the EVOH resin is employed, the temperature of the EVOH resin is equal to the temperature of the solution. In the case of a pellet or a molded product, the temperature of the EVOH resin is determined by measuring the temperature of the stacked pellet or the molded product with a thermometer inserted into it every 5 min until a constant measurement is found, and calculating an average temperature of the measurements found at five sites.

Hereinafter, the water content of the hydrous pellet before irradiating with an infrared ray, or that of the dry pellet will be explained. In this process, when a pellet having a water content before irradiating with an infrared ray of 10% by mass or greater and 200% by mass or less is used as the hydrous pellet, and when the water content of 0.01% by mass or greater and less than 10% by mass, the pellet is referred to as a dry pellet.

When the irradiation of the infrared ray is carried out on a hydrous pellet, the upper limit of the water content of the hydrous pellet before irradiating with an infrared ray is preferably 200% by mass, more preferably 170% by mass, still more preferably 140% by mass, and particularly preferably 110% by mass. When the water content of the hydrous pellet is beyond the upper limit, the resin temperature is not sufficiently elevated by the irradiation with an infrared ray due to too high water content, and thus the polyene compound may not be volatilized enough. On the other hand, although the lower limit of the water content of the hydrous pellet before irradiating with an infrared ray is not particularly limited, when, for example, the hydrous pellet before the drying step is irradiated, it is preferably 10% by mass, more preferably 40% by mass, and particularly preferably 80% by mass in terms of its step. In addition, when the hydrous pellet is irradiated with an infrared ray, for example, simultaneously with the drying step, water content of the hydrous pellet subjected to the drying step preferably falls within the range that is the same as the water content of the hydrous pellet before irradiating with an infrared ray, and preferably 0.01% by mass or greater and less than 10% by mass of the water content of the dry pellet after the drying step. On the other hand, although the lower limit of the water content of the hydrous pellet before irradiating with an infrared ray is not particularly limited, when, for example, the hydrous pellet before the drying step is irradiated, it is preferably 10% by mass, more preferably 40% by mass, and particularly preferably 80% by mass in terms of its step. In addition, when the hydrous pellet is irradiated with an infrared ray, for example, simultaneously with the drying step, water content of the hydrous pellet subjected to the drying step preferably falls within the range that is the same as the water content of the hydrous pellet before irradiating with an infrared ray, and preferably 0.01% by mass or greater and less than 10% by mass of the water content of the dry pellet after the drying step.

Moreover, the lower limit of the water content of the dry pellet and the molded product before irradiating with an infrared ray is preferably 0.01% by mass, more preferably 0.02% by mass, still more preferably 0.03% by mass, and particularly preferably 0.05% by mass. When the water content of the dry pellet and the film or the like that is a molded product is below the lower limit, volatilization by way of azeotropy of the polyene compound with water does not sufficiently occur due to the too low water content. On the other hand, although the upper limit of the water content of the dry pellet and the molded product before irradiating with an infrared ray is not particularly limited, it is preferably 9% by mass, more preferably 1% by mass, and particularly preferably 0.5% by mass in terms of its step.

It should be noted that the water content value (% by mass) is on dry basis unless otherwise stated in particular. The water content on dry basis is a value derived by dividing the mass of water included in a hydrous or dry pellet by the dry mass of the resin included in the hydrous or dry pellet. Also with respect to molded products such as films may be similar determination can be carried out.

<EVOH Resin>

The EVOH resin of the present invention is obtained by the aforementioned method for production. EVOH in this EVOH resin is a polymer having an ethylene unit and a vinyl alcohol unit as main structural units.

The lower limit of the ethylene content of EVOH (i.e., rate of the number of ethylene units relative to the total number of monomer units in EVOH) is preferably 20% by mole, more preferably 25% by mole, and still more preferably 30% by mole. On the other hand, the upper limit of the ethylene content in EVOH is preferably 60% by mole, more preferably 55% by mole, still more preferably 50% by mole, and particularly preferably 45% by mole. When the ethylene content of EVOH falls within this range, sufficient appearance characteristics and long-run workability can be achieved. When the ethylene content in EVOH is below the lower limit, for example, water resistance, hot water resistance and gas barrier properties under high humidity achieved upon molding a laminate may be deteriorated, or deterioration of melt formability, occurrence of yellowing and the like may be caused. To the contrary, when the ethylene content of EVOH is beyond the upper limit, deterioration of gas barrier properties achieved upon molding a laminate, and occurrence of yellowing and the like may be likely to be caused.

The lower limit of the degree of saponification of EVOH (i.e., rate of the number of vinyl alcohol units relative to the total number of vinyl alcohol units and vinyl ester units in EVOH) is preferably 90% by mole, more preferably 95% by mole, and particularly preferably 99% by mole. On the other hand, the upper limit of the degree of saponification of EVOH is preferably 100% by mole, and still more preferably 99.99% by mole. When the degree of saponification of EVOH is below the lower limit, gas barrier properties achieved upon molding a laminate may be deteriorated, and coloring resistance may be unsatisfactory.

In the case in which EVOH is constituted with a mixture of two or more kinds of EVOHs having different ethylene contents, the ethylene content is defined as an average value calculated from the mixed mass ratio. In this case, it is preferred that the maximum difference between ethylene contents of two EVOHs is 30% by mole or less, and the difference between degrees of saponification is preferably 10% by mole or less. When carried out under conditions out of these requirements, gas barrier properties achieved upon molding a laminate may be deteriorated. The difference in ethylene contents is more suitably 20% by mole or less, and more suitably 15% by mole or less. Also, the difference in the degrees of saponification is more suitably no greater than 7%, and still more suitably no greater than 5%.

The EVOH resin of the present invention achieves advantageous effects of the present invention by volatilization the polyene compounds that become the cause of coloring owing to the irradiation with an infrared ray as described above, the EVOH resin preferably does not substantially contain a polyene compound in a region from the surface over the depth of 5 nm. In this regard, the phrase "does not substantially contain a polyene compound" indicates that when the surface of the EVOH resin is analyzed using "TOF-SIMS 5" manufactured by ION-TOF GmbH, peak intensity of polyene compounds is tenth or less as compared with the peak intensity of the infrared ray-unirradiated EVOH resin. Note that the aforementioned definition has substantially the same meaning that the content of a polyene compound on the surface of the EVOH resin is tenth or less of the content of the polyene compound inside the EVOH resin when the EVOH resin has a solid form.

Measurement Conditions

Name of apparatus: manufactured by ION-TOF GmbH "TOF-SIMS 5"
Primary ion gun: $Bi_3^{++}$ ion gun,
Pulse electric current value: 0.2 pA
Applied voltage: 25 keV
Frequency: 10 kHz
Measurement mode: bunching mode
Charge correction: electron gun used
Measurement range: 75×75 μm (128×128 pixel)
Number of scanning time: 32 (within static limit range)
Polarity: cation detected (Additives)

In order to improve each performance, the EVOH resin obtained by the method for production of the present invention preferably contains a variety of additives such as acid, metal salts, etc. The additives may include alkali metal salts, carboxylic acids and/or carboxylate ions, phosphate compounds and boron compounds described later. According to the method for production of the present invention, occurrence of yellowing and the like can be prevented also when these additives are contained in the resin.

The EVOH resin of the present invention preferably contains an alkali metal ion in light of thermal stability. The content of the alkali metal ion in dry EVOH resin is preferably 2.5 μmol/g or greater and 22 μmol/g or less, more preferably 3.5 μmol/g or greater and 16 μmol/g or less, and particularly preferably 4.5 μmol/g or greater and 10 μmol/g or less in alkali metal element equivalent.

The process for adjusting the content of the alkali metal element to fall within the above range is not particularly limited. Note that EVOH after subjecting to the saponification reaction usually contains the alkali metal element as a saponification catalyst residue. Thus, a process in which EVOH after subjecting to the saponification reaction using the aforementioned process is washed thereby removing the alkali metal element, and thereafter the alkali metal element is included in a given amount again to obtain an EVOH resin is preferred.

The process for including the alkali metal element in the EVOH resin may include: a process of immersing EVOH in a solution containing an alkali metal element; a process of the EVOH resin is melted and mixed with a solution containing a compound including an alkali metal element, or an alkali metal element, a process of dissolving the EVOH resin in a suitable solvent and mixed with a compound including an alkali metal element; and the like.

In the case in which the EVOH resin is immersed in a solution containing an alkali metal element, the concentration of the alkali metal element in this solution is not particularly limited. Also, the solvent of the solution is not particularly limited, but is preferably an aqueous solution in light of the handleability and the like. The mass of the solution used for immersing the EVOH resin is usually at least three times, and preferably at least 10 times the mass of EVOH as dried. Although suitable range of the immersion time may vary depending on the form of the EVOH resin, it is usually 1 hour or longer, and preferably 2 hrs or longer. The mode of the immersion in the solution is not particularly limited, and the immersion may be carried out after dividing into a plurality of aliquots, or the immersion may be carried out once. In light of simplification of the step, the immersion is preferably carried out once. A tower system apparatus may be suitably used to continuously carry out the immersion.

The EVOH resin of the present invention may also contain a carboxylic acid and/or a carboxylate ion. The content of the carboxylic acid and/or the carboxylate ion in the dry EVOH resin is preferably 0.05 µmol/g or greater and 25 µmol/g or less, more preferably 0.5 µmol/g or greater and 22 µmol/g or less, still more preferably 2 µmol/g or greater and 20 µmol/g or less, and particularly preferably 5 µmol/g or greater and 18 µmol/g or less. Examples of the carboxylic acid include succinic acid, adipic acid, benzoic acid, capric acid, lauric acid, glycolic acid, lactic acid, formic acid, acetic acid, propionic acid and the like. Of these, acetic acid, propionic acid and lactic acid are more preferred, and acetic acid and propionic acid are particularly preferred, in light of appropriate acidity, and ease in controlling the pH of the EVOH resin. Anions of these carboxylic acids are included in preferable carboxylate ions. When the content of the carboxylic acid and/or the carboxylate ion exceeds 25 µmol/g, thermal stability of the EVOH resin is deteriorated, and the resulting resin or molded article is likely to be accompanied by poor appearance such as coloring, fish eye, streak and the like.

Moreover, the EVOH resin of the present invention preferably contains a phosphate compound in an amount of 1 to 500 ppm in phosphate equivalent. The type of the phosphate compound is not particularly limited, and any of various types of acids such as phosphoric acid and phosphorous acid, and salts thereof may be used. The phosphate may be any one of primary phosphate, secondary phosphate and tertiary phosphate, Also, the cation species is not particularly limited; however, it is preferably an alkali metal salt, or an alkaline earth metal salt. In particular, the phosphate compound is preferably included in the form of phosphoric acid, sodium dihydrogen phosphate, potassium dihydrogen phosphate, disodium hydrogen phosphate or dipotassium hydrogen phosphate, and adding the phosphate compound in the form of phosphoric acid, sodium dihydrogen phosphate or potassium dihydrogen phosphate is more preferred.

Furthermore, the upper limit of the content of the phosphate compound is preferably 400 ppm or less, and more preferably 300 ppm or less in phosphate equivalent. Also, the lower limit of the content of the phosphate compound is more preferably 3 ppm or greater, still more preferably 5 ppm or greater, and particularly preferably 10 ppm or greater.

In addition, the EVOH resin may contain a boron compound in the range not to impair the object of the present invention. Examples of the boron compound include boric acids such as orthoboric acid, metaboric acid, and tetraboric acid; boric acid esters, boric acid salts, hydrogenated boron compounds, and the like. Examples of the boric acid salt include borax, and alkali metal salts and alkaline earth metal salts of the aforementioned various types of boric acids, and the like. Among these compounds, orthoboric acid is preferred. When a boron compound is added, the content in terms of boron element is preferably in the range of 20 to 2000 ppm, and more preferably in the range of 50 to 1800 ppm.

As described in the foregoing, the EVOH resin obtained by the method for production of the present invention may contain at least one selected from the group consisting of carboxylic acid, phosphate compounds and boron compound as needed, and the process for including the same is not particularly limited. For example, a process that is similar to the process for including the aforementioned alkali metal element may be employed.

(Other Additives, Etc.)

To the EVOH resin obtained by the method for production of the present invention may be also added in addition to the aforementioned additives, an appropriate amount of a plasticizer, a stabilizer, a surfactant, a coloring agent, an ultraviolet ray absorbing agent, a slip agent, an antistatic agent, a desiccating agent, a crosslinking agent, a metal salt other than alkali metals, a filler, a reinforcing agent such as various types of fiber, and the like in the range not to impair the effects of the present invention.

Furthermore, an appropriate amount of a thermoplastic resin other than EVOH may be also blended in the range not to impair the effects of the present invention. Examples of the thermoplastic resin which may be used include various types of polyolefins (polyethylene, polypropylene, poly 1-butene, poly 4-methyl-1-pentene, ethylene-propylene copolymers, copolymers of ethylene with α-olefin having 4 or more carbon atoms, copolymers of polyolefin and maleic anhydride, ethylene-vinyl ester copolymers, ethylene-acrylate copolymer, or modified polyolefins prepared by grafting modification of the same with an unsaturated carboxylic acid or a derivative thereof), various types of nylon (nylon-6, nylon-6,6, nylon-6/6,6 copolymer, etc.), polyvinyl chloride, polyvinylidene chloride, polyesters, polystyrene, polyacrylonitrile, polyurethane, polyacetal and modified polyvinyl alcohol resins, and the like.

Although the form of the EVOH resin of the present invention is not particularly limited, any one of molded product forms such as a solution form, a paste form, a powder form, a pellet form and a film form is acceptable. The EVOH resin is preferably in a pellet form or a film form owing to easily executed irradiation with an infrared ray, and easily achievable effect of preventing yellowing by way of the irradiation.

(Laminate)

The laminate of the present invention is a laminate provided with at least one layer obtained from the EVOH resin of the present invention. The layer structure of the laminate is not particularly limited; however, provided that: a layer obtained from the resin of the present invention is designated as E; a layer obtained from an adhesive resin is designated as Ad; and a layer obtained from a thermoplastic resin is designated as T, examples of the layer structure include T/E/T, E/Ad/T, T/Ad/E/Ad/T, and the like. Each layer of these may be either monolayer, or a multilayer.

The method for producing the laminate is not particularly limited. For example, a method of melt extruding a thermoplastic resin onto a molded product obtained from the EVOH resin of the present invention (film, sheet. Etc.); a method of coextruding the EVOH resin of the present invention and other thermoplastic resin; a method of coinjecting the EVOH resin of the present invention with a thermoplastic resin; a method of laminating a molded article formed from the EVOH resin of the present invention and a film or a sheet of other base material using a well-known adhesive such as an organic titanium compound, an isocyanate compound or a polyester based compound; and the like may be exemplified.

Among these methods, a method of coextruding the EVOH resin of the present invention and other thermoplastic resin is preferably used. The EVOH resin of the present invention is superior in long-run workability and appearance characteristics, and in particular, coloring is less likely to occur even if melted at a comparatively high temperature. Therefore, even if the EVOH resin of the present invention and other thermoplastic resin having a comparatively high melting temperature are coextruded, a laminate being accompanied by suppressed occurrence of coloring such as yellowing, and being superior in the appearance can be obtained.

Examples of the thermoplastic resin used for other layer in the laminate include: homopolymers of an olefin or copolymers thereof such as linear low density polyethylene, low density polyethylene, medium density polyethylene, high density polyethylene, ethylene-vinyl acetate copolymers, ethylene-propylene copolymers, polypropylene, and propylene-α-olefin copolymers (α-olefin having 4 to 20 carbon atoms), polybutene, polypentene; polyesters such as polyethylene terephthalate; polyamides such as polyester elastomers, nylon-6, and nylon-6,6; polystyrene, polyvinyl chloride, polyvinylidene chloride, acrylic resins, vinyl ester based resins, polyurethane elastomers, polycarbonate, chlorinated polyethylene, chlorinated polypropylene, and the like. Of these, polypropylene, polyethylene, ethylene-propylene copolymers, ethylene-vinyl acetate copolymers, polyamides, polystyrene, polyesters are preferably used.

The aforementioned adhesive resin is not particularly limited as long as it has adhesiveness with the EVOH resin of the present invention and the thermoplastic resin, but adhesive resins containing a carboxylic acid modified polyolefin are preferred. As the carboxylic acid modified polyolefin, a carboxyl group-containing modified olefin-derived polymer can be suitably used which is obtained by allowing an ethylenic unsaturated carboxylic acid or an anhydride thereof to be chemically bonded (for example, addition reaction, graft reaction, etc.) to an olefin-derived polymer. In this regard, examples of the olefin-derived polymer include, e.g., polyolefins such as polyethylene (low pressure, middle pressure, high pressure), linear low density polyethylene, polypropylene and polybutene, copolymers (for example, ethylene-vinyl acetate copolymers, ethylene-ethyl acrylate copolymers, etc.) of olefin and other monomer (vinyl ester, unsaturated carboxylate ester, etc.). Among these, linear low density polyethylene, ethylene-vinyl acetate copolymers (content of vinyl acetate being 5% by mass or greater and 55% by mass or less) and ethylene-ethyl acrylate copolymers (content of ethyl acrylate being 8% by mass or greater and 35% by mass or less) are preferred, and linear low density polyethylene and ethylene-vinyl acetate copolymers are particularly preferred. As the ethylenic unsaturated carboxylic acid or an anhydride thereof, ethylenic unsaturated monocarboxylic acids, or esters thereof, ethylenic unsaturated dicarboxylic acids, or mono- or diesters thereof, or anhydrides of the same are exemplified, and of these, ethylenic unsaturated dicarboxylic acid anhydrides are preferred. Specifically, maleic acid, fumaric acid, itaconic acid, maleic anhydride, itaconic anhydride, maleic monomethyl ester, maleic monoethyl ester, maleic diethyl ester, fumaric monomethyl ester and the like are included, and particularly, maleic anhydride is suitable.

Although the process for coextrusion of the EVOH resin of the present invention and the thermoplastic resin, etc., is not particularly limited, a multimanifold-merging T die method, a feedblock-merging T die method, an inflation method, and the like may be exemplified.

By subjecting thus obtained coextrusion laminate to secondary processing, various types of molded products (films, sheets, tubes, bottles, etc.) can be obtained. The various types of molded products include, for example, articles as in the following:

(1) multilayer costretched sheets or films obtained by stretching a laminate (sheet or film, etc.) in an uniaxial or biaxial direction, followed by subjecting to a heat treatment;

(2) multilayer rolled sheets or films obtained by rolling a laminate (sheet or film, etc.);

(3) multilayer tray cup shaped vessels obtained by subjecting a laminate (sheet or film, etc.) to a hot forming process such as vacuum forming, air-pressure forming or vacuum air-pressure forming; and (4) bottles, cup shaped vessels and the like obtained by stretch blow molding or the like of a laminate (pipe, etc.).

Note that the secondary processing is not limited to each process illustrated for obtaining the molded product described above, and for example, any well-known secondary processing other than the aforementioned processes such as blow molding may be used ad libitum.

Since the laminate has a layer obtained from an EVOH resin having appearance characteristics (noncoloring properties) and sufficient long-run workability, it is accompanied by fewer fish eye, gel and seed (dirt under paint) and less coloring such as yellowing and thus, for example, can be suitably used as a food vessel and the like such as a deep draw vessel, a cup shape vessel, and a bottle.

EXAMPLES

Hereinafter, the present invention is explained in more detail by way of Example, but the present invention is not in any way limited to these Examples.

(Quantitative Determination Method)

It should be noted that each quantitative determination in Examples herein was carried out according to the following method.

(1) Ethylene Content of EVOH

The ethylene content of an ethylene-vinyl alcohol copolymer was determined according to the analysis method described below by carrying out $^1$H-NMR measurement under the following measurement conditions.

Measurement Conditions

Name of apparatus: manufactured by JEOL Ltd., NMR spectrometer "Lambda 500"

Observation frequency: 500 MHz

Solvent: DMSO-d6

Polymer concentration: 4% by mass

Measurement temperature: 80° C.

Cumulated number: 256 times

Analysis Method

The ethylene content was calculated from the intensity ratio of: methine protons of ethylene units, vinyl alcohol units and vinyl ester units (peak at 0.6 to 2.1 ppm), methine protons of vinyl alcohol units (peak at 3.15 to 4.15 ppm), and methine protons of vinyl ester units (peak at 1.95 to 2.00 ppm).

(2) Degree of Saponification

Dry EVOH pellet was crushed by freeze crushing. Thus resulting crushed EVOH was sieved with a sieve having a nominal dimension of 1 mm (according to normal sieve standard JIS-Z8801). EVOH powder passed through the sieve in an amount of 5 g was immersed in 100 g of ion exchanged water, and the mixture was stirred at 85° C. for 4 hrs, followed by an operation of drainage and drying repeated twice. Using thus obtained powder EVOH after washing, measurement of $^1$H-NMR was carried out under the following measurement conditions, and the degree of saponification was determined by the analysis method described below.

Measurement Conditions

Name of apparatus: manufactured by JEOL Ltd.,

NMR spectrometer "Lambda 500"

Observation frequency: 500 MHz

Solvent: DMSO-d6

Polymer concentration: 4% by mass

Measurement temperature: 40° C. and 95° C.

Cumulated number: 600 times

Pulse delay time: 3.836 sec

Sample rotation speed: 10 to 12 Hz

Pulse width (90° pulse): 6.75 μsec

Analysis Method

By the measurement at 40° C., a peak of hydrogen in water molecules was found at around 3.3 ppm, which overlapped with a peak in the range of 3.1 to 3.7 ppm among peaks of methine hydrogen of the vinyl alcohol units of EVOH. On the other hand, when measured at 95° C., the overlapping caused at 40° C. could be obviated; however, a peak of hydrogen of the hydroxyl groups of the vinyl alcohol units of EVOH was present at around 4 to 4.5 ppm, which overlapped with the range of 3.7 to 4 ppm of peaks of methine hydrogen of vinyl alcohol units of EVOH. Accordingly, for quantitative determination of methine hydrogen of vinyl alcohol units of EVOH (3.1 to 4 ppm), measurement data at 95° C. were employed with respect to the range of 3.1 to 3.7 ppm, and measurement data at 40° C. were employed with respect to the range of 3.7 to ppm in order to avoid overlapping with peaks of hydrogen of water or hydroxyl groups. Thus, the total amount of the methine hydrogen was quantitatively determined in terms of the total value of these measurements. Note that the peak of hydrogen of water or hydroxyl group has been known to shift to a high magnetic field side by elevating the measurement temperature. Therefore, analyses were conducted as in the following using both measurement results at 40° C. and 95° C. From the spectrum obtained at 40° C. as described above, an integrated value ($I_1$) of the peak of the chemical shift at 3.7 to 4 ppm, and an integrated value ($I_2$) of the peak of the chemical shift at 0.6 to 1.8 ppm were determined. On the other hand, from the spectrum obtained at 95° C., an integrated value ($I_3$) of the peak of the chemical shift at 3.1 to 3.7 ppm, an integrated value ($I_4$) of the peak of the chemical shift at 0.6 to 1.8 ppm, and an integrated value ($I_5$) of the peak of the chemical shift at 1.9 to 2.1 ppm were determined. In this process, the peak of the chemical shift at 0.6 to 1.8 ppm principally derives from methylene hydrogen, whereas the peak of the chemical shift at 1.9 to 2.1 ppm derives from methyl hydrogen in unsaponified vinyl acetate units. From these integrated values, a degree of saponification was calculated according to the following formula (II).

[formula 2]

$$\text{Degree of saponification (mol \%)} = \frac{(I_1/I_2 + I_3/I_4) \times 100}{(I_1/I_2 + I_3/I_4) + (I_5/I_4)/3} \quad (II)$$

(3) Melting Temperature of EVOH

The melting temperature of EVOH was determined by a differential scanning calorimetric analysis. More specifically, a differential scanning calorimetric analysis (manufactured by Seiko Electronics Co., Ltd., differential scanning calorimeter (DSC) model RDC220/SSC5200H) was performed on the pellet of the EVOH resin according to JIS-K7121 by elevating the temperature from 30° C. to 220° C. at a rate of 10° C./min, followed by quenching at a rate of 100° C./min to 30° C. and again elevating the temperature from 30° C. to 220° C. at a rate of 10° C./min. For calibration of the temperature, indium and lead were used. A peak melting temperature (Tpm) was determined from the second run chart as referred to in the JIS described above, and defined as the melting temperature.

(4) Water Content of EVOH Resin Pellet

Using a halogen moisture analyzer "HR73" manufactured by Mettler-Toledo International Inc., the water content of the EVOH pellet on dry basis was measured under conditions of a drying temperature of 180° C., a drying time of 20 min, and a sample amount of about 10 g.

(5) Quantitative Determination of Alkali Metal Ion

The dry EVOH pellet was crushed by freeze crushing. Thus obtained EVOH powder in an amount of 10 g and 50 mL of ion exchanged water were charged in a 100 mL stoppered Erlenmeyer flask equipped with a cooling condenser, and the mixture was stirred at 95° C. for 10 hrs to execute heat extraction. Thus obtained extract in a volume of 2 mL was diluted with 8 mL of ion exchanged water. Thus diluted extract was subjected to a quantitative analysis using an ICP emission spectrophotometer "Optima 4300 DV" manufactured by PerkinElmer Japan Co., Ltd., at an observation wavelength of 589.592 nm, whereby the amount of sodium ion was quantitatively determined.

(6) Quantitative Determination of Phosphate Compounds

The dry EVOH pellet was crushed by freeze crushing. Thus obtained EVOH powder in an amount of 1.0 g, 15 mL of conc. nitric acid and 4 mL of conc. sulfuric acid were charged into a stoppered 100 mL Erlenmeyer flask equipped with a cooling condenser to execute heat degradation at 200 to 230° C. Thus obtained solution was diluted to 50 mL with ion exchanged water in a volumetric flask. The solution was subjected to a quantitative analysis using an ICP emission spectrophotometer "Optima 4300 DV" manufactured by PerkinElmer Japan Co., Ltd., at an observation wavelength of 214.914 nm, whereby the amount of phosphorus element was quantitatively determined, and the amount of phosphate compounds was calculated to give a value of phosphate equivalent.

(7) Quantitative Determination of Boron Compound

A dry EVOH pellet provided as a sample in an amount of 50 mg was completely combusted by an oxygen flask combustion method, and thus resultant combusted ash deposition was dissolved in 10 mL of a 1 mol/L aqueous nitric acid solution. The solution was subjected to a quantitative analysis using an ICP emission spectrophotometer "Optima 4300 DV" manufactured by PerkinElmer Japan Co., Ltd., at an observation wavelength of 249.667 nm, whereby the content of boron compounds was obtained in a value of boron element equivalent.

(8) Intensity of the Infrared Ray

The intensity of the infrared ray was calculated by a measuring method illustrated in the foregoing embodiments.

(9) Resin Temperature in the Step of Irradiation with Infrared Ray

The temperature of the EVAc resin paste was measured with a thermometer in terms of the temperature of this paste. Also, the temperature of the EVOH resin was measured by a method illustrated in the foregoing embodiments.

Example 1

Production of Ethylene-Vinyl Acetate Copolymer

To a 250 L pressure reactor equipped with a stirrer, a nitrogen feed port, an ethylene feed port, an initiator addition port and a delay (consecutive addition) solution addition port were charged 83.0 kg of vinyl acetate and 26.6 kg of methanol, and the temperature was elevated to 60° C. Thereafter, the system was substituted with nitrogen by nitrogen bubbling for 30 min. Next, ethylene was charged such that the reactor pressure became 3.6 MPa. As an initiator a 2.5 g/L solution of 2,2'-azobis(4-methoxy-2,4-dimethylvaleronitrile) (AMV) dissolved in methanol was prepared, and the solution was substituted with nitrogen by bubbling nitrogen gas. After the internal temperature of the polymerization bath was adjusted to 60° C., 362 mL of the initiator solution was injected to initiate polymerization. During the polymerization, ethylene was introduced to maintain the reactor pressure of 3.6 MPa and the polymerization temperature of 60° C., and the initiation solution was continuously added at 1119.5 mL/hr using the aforementioned initiator solution to perform polymerization. 5.0 hrs later, the polymerization was stopped by cooling when the rate of polymerization reached 40%. After the reactor was opened to remove ethylene, nitrogen gas was bubbled to completely eliminate ethylene. Next, the copolymer solution was continuously supplied through an upper part of a tower filled with Raschig ring, and methanol was blown through a lower part of the tower. Mixed vapor of methanol and unreacted vinyl acetate monomer was allowed to outflow through the top of the tower, whereby unreacted vinyl acetate monomer was removed through the bottom of the tower to give a methanol solution of an ethylene-vinyl acetate copolymer (EVAc).

(Saponification)

To thus obtained EVAc solution was added methanol to adjust a concentration of 15% by mass. To 253.4 kg of thus prepared methanol solution of EVAc (38 kg of EVAc in the solution) was added 76.5 L of an alkali solution (20% by mass NaOH solution in methanol, molar ratio (MR) relative to vinyl acetate units in EVAc:0.4) and the mixture was stirred at 60° C. for 4 hrs to carry out saponification of EVAc. After 6 hrs from starting the reaction, the reaction liquid was neutralized by adding 11.0 kg of acetic acid and 60 L of water to terminate the reaction.

(Washing)

The neutralized reaction liquid was transferred from the reactor to a metal drum, and left to stand at room temperature for 16 hrs, thereby permitting cooling and hardening to give a paste form. Thereafter, liquid was removed from the resin in the paste form using a centrifugal separator ("H-130" manufactured by Kokusan Centrifuge Co., Ltd., number of revolution: 1,200 rpm). Next, a step of washing the resin with water was conducted for 10 hrs in which washing was carried out while continuously supplying ion exchanged water to the central portion of the centrifugal separator from above. The conductivity of the washing liquid after 10 hrs from starting washing was 30 µS/cm (measured with "CM-30ET" manufactured by TOA Electronics Ltd.).

(Deposition)

EVOH in the paste form obtained in this manner was dried using a dryer at 60° C. for 48 hrs to give EVOH in the form of powder. Thus dried EVOH in the form of powder in an amount of 20 kg was dissolved in 43 L of a water/methanol mixed solution (mass ratio: water/methanol=4/6) while stirring at 80° C. for 12 hrs. Next, the stirring was stopped, and the temperature of the dissolver was lowered to 65° C. After leaving to stand for 5 hrs, degassing of the water/methanol solution of EVOH was carried out. Then, the EVOH was extruded from a gold plate provided with a circular opening having a diameter of 3.5 mm into a water/methanol mixed solution (mass ratio: water/methanol=9/1) at 5° C. to allow for deposition to give a strand form, and cut to obtain a hydrous EVOH pellet having a diameter of about 4 mm and a length of about 5 mm.

(Washing)

Thus obtained hydrous EVOH pellet in an amount of 40 kg and 150 L of ion exchanged water were placed in a metal drum having a height of 900 mm and an opening diameter of 600 mm. An operation of washing at 25° C. for 2 hrs while stirring, and eliminating the liquid was repeated twice. Next, 150 L of 1 g/L aqueous acetic acid solution was added to 30 kg of the hydrous EVOH pellet, and an operation of washing at 25° C. for 2 hrs while stirring, and eliminating the liquid was repeated twice. Furthermore, 150 L of ion exchanged water was added to 30 kg of the hydrous EVOH pellet, and an operation of washing at 25° C. for 2 hrs while stirring, and eliminating the liquid was repeated six times. The conductivity of the washing liquid after carrying out the sixth washing was measured with "CM-30ET" manufactured by TOA Electronics Ltd., and as a result, the washing liquid was revealed to have a conductivity of 3 µS/cm. Thus resulting hydrous EVOH pellet had a water content of 110% by mass.

(Preparation of Each Component and Drying)

Subsequently, 3.0 kg of the hydrous EVOH pellet was charged into 30 L of an aqueous solution for acid treatment prepared by blending 0.80 g/L acetic acid as a carboxylic acid, 0.50 g/L sodium acetate as an alkali metal salt, 0.015 g/L phosphoric acid as a phosphate compound, and 0.2 g/L boric acid as a boron compound in water at each blend rate. Immersion and stirring of the mixture were then allowed at 25° C. for about 5 hrs. The hydrous pellet after the treatment was dried at 80° C. for 3 hrs, and subsequently at 120° C. for 24 hrs to obtain an EVOH pellet.

(EVOH Pellet)

EVOH in the EVOH pellet had an ethylene content of 32% by mole, and a degree of saponification of 99.98% by mole or greater. Also, the content of carboxylic acid and carboxylate ion in the EVOH pellet was 16.7 µmol/g; the content of alkali metal ion was 7.39 µmol/g; the content of phosphate compounds was 10 ppm in phosphate equivalent; and the content of boron compounds was 890 ppm in a value of boron element equivalent. This EVOH pellet had a water content of 0.3% by mass. Also, the EVOH pellet had MFR (melt flow rate: 210° C.; load: 2160 g) of 3.6 g/10 min.

(Irradiation with Infrared Ray)

The EVOH pellet was placed into a cylindrical vessel. The EVOH pellet was irradiated with an infrared ray from above using an Infrared Moisture Balance "MB-30" manufactured by CBC Co., Ltd. for 1 hour, to obtain an EVOH pellet, in which coloring such as yellowing was prevented, as an EVOH resin of Example 1. The temperature of the EVOH pellet that is a resin temperature during the irradiation with an infrared ray was from 130° C. to 150° C.

Examples 2 to 7

EVOH pellets of Examples 2 to 7 were obtained in a similar manner to Example 1 except that the resin temperature of the EVOH pellet during the irradiation and the intensity of the irradiation with an infrared ray were as shown in Table 1.

Examples 8 to 11

EVOH pellets of Examples 8 to 11 were obtained in a similar manner to Example 1 except that the resin temperature of the EVOH pellet during the irradiation with an infrared ray, and irradiation time of the infrared ray were as shown in Table 1.

Example 12

The water content of the EVOH pellet after preparing each component in Example 1 and before drying was adjusted to 10% by mass, and irradiation of the EVOH pellet with an infrared ray was carried out by a similar method to Example 1. Subsequently, an EVOH pellet was obtained by drying with a similar method to Example 1.

Examples 13 to 15

The hydrous EVOH pellet having a water content of 110% by mass in Example 1 was irradiated with an infrared ray for each irradiation time changed as shown in Table 1. Subsequently, EVOH pellets were obtained by preparing each component and drying according to a similar method to Example 1.

Example 16

The EVOH pellet obtained by a similar method to Example 1 was subjected to monolayer film formation under the following conditions using a 20 mm Extruder "D2020" (D (mm)=20, L/D=20, compression ratio=2.0, screw: full flight) manufactured by Toyo Seiki Seisaku-sho, Ltd. to obtain an EVOH monolayer film.

Extrusion temperature: supply part/compression part/metering part/die=180/210/220/220° C.
Number of revolution of screw: 80 rpm
Discharge rate: 1.0 kg/hr
Drawing roll temperature: 80° C.
Drawing roll speed: 3.1 m/min.
Film thickness: 50 μm Subsequently, the EVOH film was irradiated with an infrared ray with an apparatus similar to Example 1 for 1 hour to obtain an EVOH film, in which coloring such as yellowing was prevented, as an EVOH resin of Example 16. The temperature of the EVOH film during irradiation with an infrared ray was from 130° C. to 150° C.

Example 17

A paste composed of a methanol solution of the ethylene-vinyl acetate copolymer in Example 1 was irradiated with an infrared ray for 1 hour in a similar manner to Example 1. The temperature of the EVOH paste that is a resin temperature during irradiation with an infrared ray was from 60° C. to 80° C. Subsequently, as an EVOH resin of Example 17 an EVOH pellet enabling prevention of coloring such as yellowing was obtained by subjecting the EVOH paste to similar steps to Example 1.

Examples 18 to 19

EVOH pellets of Examples 18 and 19 were obtained in a similar manner to Example 1 except that ethylene contents of the EVOH were as shown in Table 1.

Comparative Example 1

An EVOH pellet of Comparative Example 1 was obtained in a similar manner to Example 1 except that the EVOH pellet was not irradiated with an infrared ray.

Comparative Example 2

An EVOH pellet of Comparative Example 2 was obtained in a similar manner to Example 1 except that hot air at 150° C. was blown in place of irradiating the EVOH pellet with an infrared ray.

Comparative Example 3

An EVOH pellet of Comparative Example 3 was obtained in a similar manner to Example 1 except that the EVOH pellet was irradiated with an ultraviolet ray in place of irradiating with an infrared ray.

TABLE 1

| | Ethylene content % by mole | Degree of saponification % by mole | Form | Water content % by mass[*1] | Melting temperature ° C. | Light or heat | Wavelength[*2] nm |
|---|---|---|---|---|---|---|---|
| Example 1 | 32 | 99.98 or greater | pellet | 0.3 | 183 | Infrared ray | 1,100 |
| Example 2 | 32 | 99.98 or greater | pellet | 0.3 | 183 | Infrared ray | 1,100 |
| Example 3 | 32 | 99.98 or greater | pellet | 0.3 | 183 | Infrared ray | 1,100 |
| Example 4 | 32 | 99.98 or greater | pellet | 0.3 | 183 | Infrared ray | 1,100 |
| Example 5 | 32 | 99.98 or greater | pellet | 0.3 | 183 | Infrared ray | 1,100 |
| Example 6 | 32 | 99.98 or greater | pellet | 0.3 | 183 | Infrared ray | 1,100 |
| Example 7 | 32 | 99.98 or greater | pellet | 0.3 | 183 | Infrared ray | 1,100 |
| Example 8 | 32 | 99.98 or greater | pellet | 0.3 | 183 | Infrared ray | 1,100 |
| Example 9 | 32 | 99.98 or greater | pellet | 0.3 | 183 | Infrared ray | 1,100 |
| Example 10 | 32 | 99.98 or greater | pellet | 0.3 | 183 | Infrared ray | 1,100 |
| Example 11 | 32 | 99.98 or greater | pellet | 0.3 | 183 | Infrared ray | 1,100 |
| Example 12 | 32 | 99.98 or greater | pellet | 10 | 183 | Infrared ray | 1,100 |
| Example 13 | 32 | 99.98 or greater | pellet | 110 | 183 | Infrared ray | 1,100 |
| Example 14 | 32 | 99.98 or greater | pellet | 110 | 183 | Infrared ray | 1,100 |
| Example 15 | 32 | 99.98 or greater | pellet | 110 | 183 | Infrared ray | 1,100 |
| Example 16 | 32 | 99.98 or greater | film | 0.05 | 183 | Infrared ray | 1,100 |
| Example 17 | 32 | — | paste | — | 183 | Infrared ray | 1,100 |
| Example 18 | 27 | 99.98 or greater | pellet | 0.3 | 191 | Infrared ray | 1,100 |
| Example 19 | 48 | 99.98 or greater | pellet | 0.3 | 160 | Infrared ray | 1,100 |
| Comparative Example 1 | 32 | 99.98 or greater | pellet | 0.3 | 183 | — | — |
| Comparative Example 2 | 32 | 99.98 or greater | pellet | 0.3 | 183 | Heat | — |
| Comparative Example 3 | 32 | 99.98 or greater | pellet | 0.3 | 183 | ultraviolet ray | 365 |

| | Intensity W/m³ (×10³) | Temperature ° C. | Irradiation or heating time hr | ΔYI | Appearance characteristics (Coloring properties) | Long-run workability (Viscosity stability) |
|---|---|---|---|---|---|---|
| Example 1 | 330 | 130 to 150 | 1 | 5 | A | A |
| Example 2 | 384 | 145 to 160 | 1 | 4 | A | A |
| Example 3 | 362 | 140 to 160 | 1 | 4 | A | A |
| Example 4 | 296 | 105 to 125 | 1 | 4 | A | A |

TABLE 1-continued

|  | | | | | | |
|---|---|---|---|---|---|---|
| Example 5 | 272 | 85 to 110 | 1 | 3 | A | A |
| Example 6 | 241 | 85 to 105 | 1 | 3 | A | A |
| Example 7 | 241 | 75 to 95 | 1 | 3 | A | A |
| Example 8 | 330 | 70 to 80 | 0.1 | 1 | B | A |
| Example 9 | 330 | 130 to 150 | 0.5 | 3 | A | A |
| Example 10 | 330 | 130 to 150 | 3 | 4 | A | A |
| Example 11 | 330 | 130 to 150 | 5 | 3 | A | A |
| Example 12 | 330 | 130 to 150 | 1 | 4 | A | A |
| Example 13 | 330 | 130 to 150 | 1 | 4 | A | A |
| Example 14 | 330 | 130 to 150 | 5 | 7 | A | A |
| Example 15 | 330 | 130 to 150 | 10 | 6 | A | B |
| Example 16 | 330 | 130 to 150 | 1 | 2 | B | A |
| Example 17 | 1,390 | 60 to 80 | 1 | — | A | A |
| Example 18 | 330 | 130 to 150 | 1 | 2 | B | A |
| Example 19 | 330 | 130 to 150 | 1 | 2 | B | A |
| Comparative Example 1 | — | — | — | 0 | B | A |
| Comparative Example 2 | — | 130 to 150 | 2 | −16 | C | C |
| Comparative Example 3 | 28 | 20 | 1 | 0 | B | A |

*[1]value derived by dividing the mass of water included in the pellet or film by the dry mass of the resin included in the pellet or film.
*[2]to be the dominant wavelength emitted from the light source.

<Evaluation of EVOH Resin>

Evaluations of the EVOH resins of Examples 1 to 19 and Comparative Examples 1 to 3 obtained as described above were performed as in the following. The results of evaluation are shown in Table 1.

(Evaluation Method)

(1) ΔYI (change in the degree of coloring (yellowing) between before and after the light or heat treatment)

YI (yellow index) values of the EVOH pellet or the EVOH film before and after subjecting to the light or heat treatment were measured using "LabScan XE Sensor" manufactured by HunterLab, and the LYI value was calculated according to the following formula (III). It should be noted that the YI value is a marker representing the yellowness index (yellowishness) of an object. More specifically, a higher YI value suggests a greater yellowness index (yellowishness), whereas a smaller YI value suggests a lower yellowness index (yellowishness) indicating being less colored. Also, a higher ΔYI value indicates that prevention of coloring such as yellowing by a light or heat treatment is more significantly enabled.

[formula 3]

$$\Delta YI = (YI \text{ value before the treatment}) - (YI \text{ value after the treatment}) \quad (III)$$

(2) Appearance Characteristics (Degree of Coloring (Yellowing) After Light Irradiation)

The degree of coloring of the EVOH pellet or the EVOH film produced by the aforementioned method was determined by visual inspection as in the following.

Determination: criteria
A: being favorable
B: being less yellowish
C: being yellowish (3) Long-Run Workability (Viscosity Stability)

Change in torque when 60 g of the obtained EVOH pellet was kneaded in a Laboplast Mill (manufactured by Toyo Seiki Seisaku-sho, Ltd. "20R200"; biaxial, counter rotating type) at 100 rpm and 260° C. was measured. The torque was measured after 5 min from the beginning of kneading, and a time period was determined which was required until the torque value reached 1.5 times the aforementioned torque value after 5 min from the beginning. This time period being longer indicates less change in the viscosity, and more superior long-run workability.

Determination: criteria
A: 60 min or longer
B: 40 min or longer and shorter than 60 min
C: 20 min or longer and shorter than 40 min As is seen from the results shown in Table 1, it is revealed that an EVOH resin enabling prevention of yellowing, and having sufficient long-run workability can be obtained according to the method for production of Examples 1 to 19.

INDUSTRIAL APPLICABILITY

The EVOH resin of the present invention can prevent coloring such as yellowing; therefore, it can be suitably used as a material for various types of molded products, monolayer or multilayer films, sheets, pipes, vessels and fibers that are superior in appearance characteristics.

What is claimed is:

1. A method for producing an ethylene-vinyl alcohol copolymer resin, the method comprising
   a step of saponifying an ethylene-vinyl ester copolymer to obtain an ethylene-vinyl alcohol copolymer, which method further comprises
   a step of irradiating the ethylene-vinyl ester copolymer with an infrared ray prior to the saponification step, where the temperature of the ethylene-vinyl ester copolymer resin in this step of irradiation with an infrared ray is 40° C. or greater and 110° C. or less.

2. A method for producing an ethylene-vinyl alcohol copolymer resin, the method comprising
   a step of saponifying an ethylene-vinyl ester copolymer to obtain an ethylene-vinyl alcohol copolymer, which method further comprises
   a step of irradiating the ethylene-vinyl ester copolymer or the ethylene-vinyl alcohol copolymer with an infrared ray,
   the method further comprising a pelletization step of obtaining a hydrous pellet comprising an ethylene-vinyl alcohol copolymer from a solution containing the ethylene-vinyl alcohol copolymer obtained by the saponification step, wherein the step of irradiation with an infrared ray is carried out not before the pelletization step.

3. The method for producing an ethylene-vinyl alcohol copolymer resin according to claim 2, wherein the irradiation with an infrared ray in the step of irradiation with an infrared ray is carried out with an infrared ray lamp.

4. The method for producing an ethylene-vinyl alcohol copolymer resin according to claim 2, wherein the wavelength of the infrared ray in the step of irradiation with an infrared ray is 700 nm or greater and 1,000,000 nm or less.

5. The method for producing an ethylene-vinyl alcohol copolymer resin according to claim 2, wherein the intensity of the infrared ray in the step of irradiation with an infrared ray is $30 \times 10^3$ W/m$^3$ or greater and $3,000 \times 10^3$ W/m$^3$ or less.

6. The method for producing an ethylene-vinyl alcohol copolymer resin according to claim 2, wherein the irradiation time in the step of irradiation with an infrared ray is 0.1 hrs or longer and 20 hrs or shorter.

7. The method for producing an ethylene-vinyl alcohol copolymer resin according to claim 2, wherein the step of irradiation with an infrared ray is carried out not before the saponification step, and the temperature of the ethylene-vinyl alcohol copolymer resin in this step of irradiation with an infrared ray is the glass transition point or greater and the melting temperature or less of the ethylene-vinyl alcohol copolymer.

8. The method for producing an ethylene-vinyl alcohol copolymer resin according to claim 2, wherein the irradiation with an infrared ray is carried out on the hydrous pellet, and the water content of this hydrous pellet before irradiating with an infrared ray is 10% by mass or greater and 200% by mass or less.

9. The method for producing an ethylene-vinyl alcohol copolymer resin according to claim 2,
further comprising a drying step of drying the hydrous pellet to obtain a dry pellet having a water content of 0.01% by mass or greater and less than 10% by mass, wherein
the step of irradiation with an infrared ray is carried out not before the drying step.

10. The method for producing an ethylene-vinyl alcohol copolymer resin according to claim 9, wherein the dry pellet has a water content before irradiating with an infrared ray of 0.01% by mass or greater and less than 10% by mass.

11. The method for producing an ethylene-vinyl alcohol copolymer resin according to claim 9,
further comprising a molding step of molding the dry pellet to obtain a molded product including an ethylene-vinyl alcohol copolymer, wherein
the step of irradiation with an infrared ray is carried out not before the molding step.

12. The method for producing an ethylene-vinyl alcohol copolymer resin according to claim 11, wherein the molded product has a water content before irradiating with an infrared ray of 0.01% by mass or greater and less than 10% by mass.

* * * * *

UNITED STATES PATENT AND TRADEMARK OFFICE
CERTIFICATE OF CORRECTION

PATENT NO. : 8,419,999 B2
APPLICATION NO. : 13/075783
DATED : April 16, 2013
INVENTOR(S) : Toshio Tsuboi et al.

It is certified that error appears in the above-identified patent and that said Letters Patent is hereby corrected as shown below:

On the title page, Item (54), and in the Specification, Column 1, the title is incorrect.
Item (54) and Column 1 should read:

--(54) METHOD FOR PRODUCING ETHYLENE-VINYL ALCOHOL COPOLYMER RESIN, ETHYLENE-VINYL ALCOHOL COPOLYMER RESIN, AND LAMINATE--

Signed and Sealed this
Thirtieth Day of July, 2013

Teresa Stanek Rea
*Acting Director of the United States Patent and Trademark Office*